(12) United States Patent
Cameron

(10) Patent No.: US 6,244,918 B1
(45) Date of Patent: Jun. 12, 2001

(54) NOISE MUFFLER-EXHAUST FILTER FOR A MARINE ENGINE

(76) Inventor: Robert Malcolm Cameron, 444 A Hamilton St., Costa Mesa, CA (US) 92627

( * ) Notice: Subject to any disclaimer, the term of this patent is extended or adjusted under 35 U.S.C. 154(b) by 0 days.

(21) Appl. No.: 09/420,340

(22) Filed: Oct. 18, 1999

(51) Int. Cl.[7] .................................................. B63H 21/32
(52) U.S. Cl. ............................................................ 440/89
(58) Field of Search ................................. 440/88, 89, 900

(56) References Cited

U.S. PATENT DOCUMENTS

| | | |
|---|---|---|
| 5,442,148 | 8/1995 | Hensler . |
| 5,560,757 | * 10/1996 | Suzuki et al. ........................... 55/516 |
| 5,606,854 | * 3/1997 | Hoffmann ............................... 60/274 |

\* cited by examiner

*Primary Examiner*—Stephen Avila
(74) *Attorney, Agent, or Firm*—Gene Scott - Patent Law & Venture Group

(57) ABSTRACT

A muffler-filter apparatus comprises a filter housing providing a flexible cylindrical wall enclosed at one end by a screen integrally joined peripherally with a distal end rim of the cylindrical wall, and a strap device for tightening a proximal end rim of the cylindrical wall for enabling the proximal end rim of the cylindrical wall to be fixed onto a propeller hub of an outboard motor so as to position the filter housing for receiving exhausts of the outboard motor's engine. A filter media is tight fitting within the cylindrical wall so as to prevent exhaust gas blowby, and is enabled for capturing oil, dust and water from exhaust gases passing therethrough while reducing exhaust noise.

3 Claims, 2 Drawing Sheets

US 6,244,918 B1

NOISE MUFFLER-EXHAUST FILTER FOR A MARINE ENGINE

This application claims the filing date of a previously filed provisional application having Ser. No. 60/104,783 and an assigned filing date of Oct. 19, 1998 and which contains subject matter substantially the same as that described and claimed in the present application.

BACKGROUND OF THE INVENTION

1. Field of the Invention

This invention relates generally to engine mufflers, and more particularly to a muffler particularly adapted for removable mounting onto an outboard engine for silencing the noise produced by such an engine when it is operated on land as for tune-ups and such.

2. Description of Related Art

The prior art teaches marine mufflers of various types as in U.S. Pat. Nos.: 5,588,888, 4,461,230, 4,019,456, 5,329,074, 4,744,778, 4,786,265, 5,048,291, 4,239,013, 4,779,704, 5,346,416, 5,154,654, 4,643,272 and 5,719,358. Of particular interest is U.S. Pat. No. 5,442,148 to Hensler which teaches an exhaust muffler for outboard motors which is fastened to the rear end of the propeller hub and directs the motor's exhaust back into the hub of the propeller and out through the front of the propeller and the bypass exhaust ports of the motor. The muffler includes an elastomeric member and a blocking member with the blocking member having a pressure relief mechanism.

However, the prior art does not teach that a muffler for an outboard motor may be made in a manner as defined in the present application so as to define the benefits described below. In fact Hensler teaches away from the instant invention in that it teaches that it is necessary to direct exhaust back into the hub rather than to allow it to pass through the muffler. The present invention fulfills these needs and provides further related advantages as described in the following summary.

SUMMARY OF THE INVENTION

The present invention teaches certain benefits in construction and use which give rise to the objectives described below.

The present invention provides a muffler-filter apparatus comprising a housing fabricated as a flexible cylindrical wall enclosed at one end by a screen integrally joined peripherally with a distal end rim of the cylindrical wall, a means for tightening a proximal end rim of the cylindrical wall for enabling the proximal end rim of the cylindrical wall to be fixed onto a propeller hub of an outboard motor so as to position the filter housing for receiving exhausts of the outboard motor and a filter media means removably installed within the housing and providing a peripheral edge for tight fitting within the cylindrical wall so as to prevent exhaust gas blowby, the filter media means enabled for capturing oil, dust and water from exhaust gases passing therethrough while reducing exhaust noise.

A primary objective of the present invention is to provide an outboard engine muffler-filter having advantages not taught by the prior art.

Another objective is to provide such a muffler-filter enabled for quick and easy mounting onto and dismounting from, a propeller hub of an outboard motor without tools.

A further objective is to provide such a muffler-filter enabled for replacement of a filter media so as to provide the repeated use of such filter.

A yet further objective is to provide such a muffler-filter enabled for providing exhaust conductance equivalent to that provided by a water environment so as to support tune-up activities.

A still further objective is to provide such a muffler-filter enabled for selection and implementation of various filter media courseness and thicknesses as to fit a wide range of filtering and muffling needs.

Another objective is to provide such a muffler-filter enabled for reduction of noise during flushing of an engine.

Another objective is to provide such a muffler-filter enabled with a filter media assembly that is able to, at once, be inexpensive, flexible and yet sustain rigidity for preventing exhaust gas blowby.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
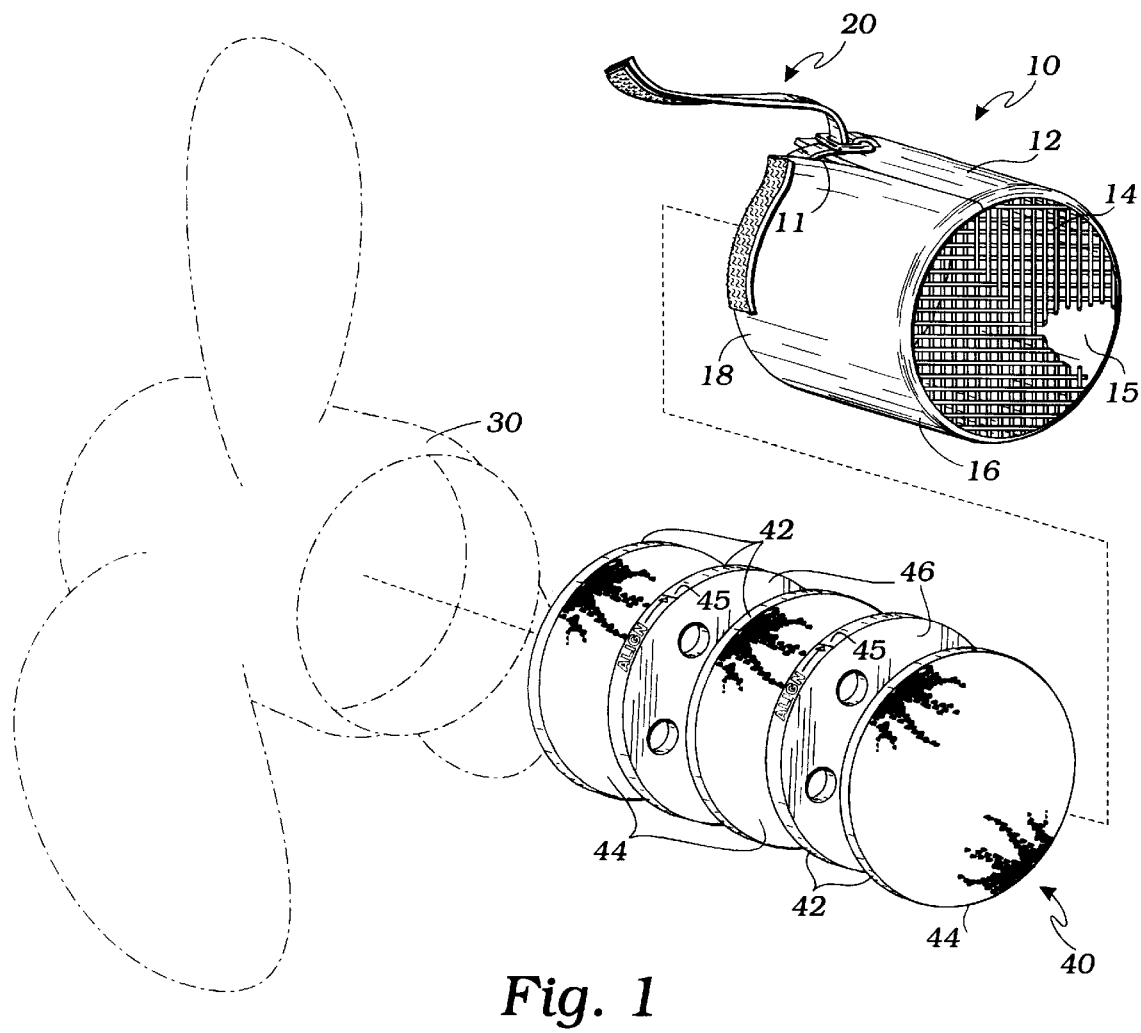
FIG. 1 is an exploded perspective view of the preferred embodiment of the present invention.
Figures 2A, 2B:
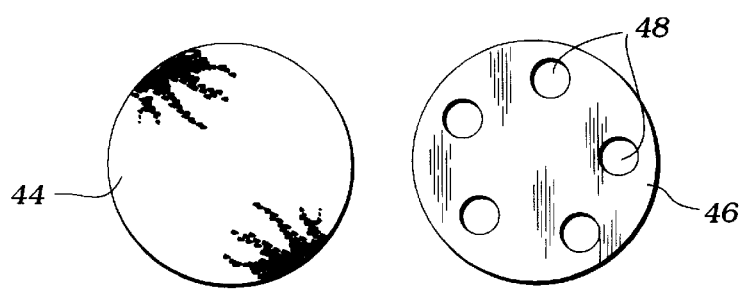
FIG. 2A is a plan view of one side of a filter element thereof.
FIG. 2B is a plan view of one side of a further filter element thereof.
Figure 3:
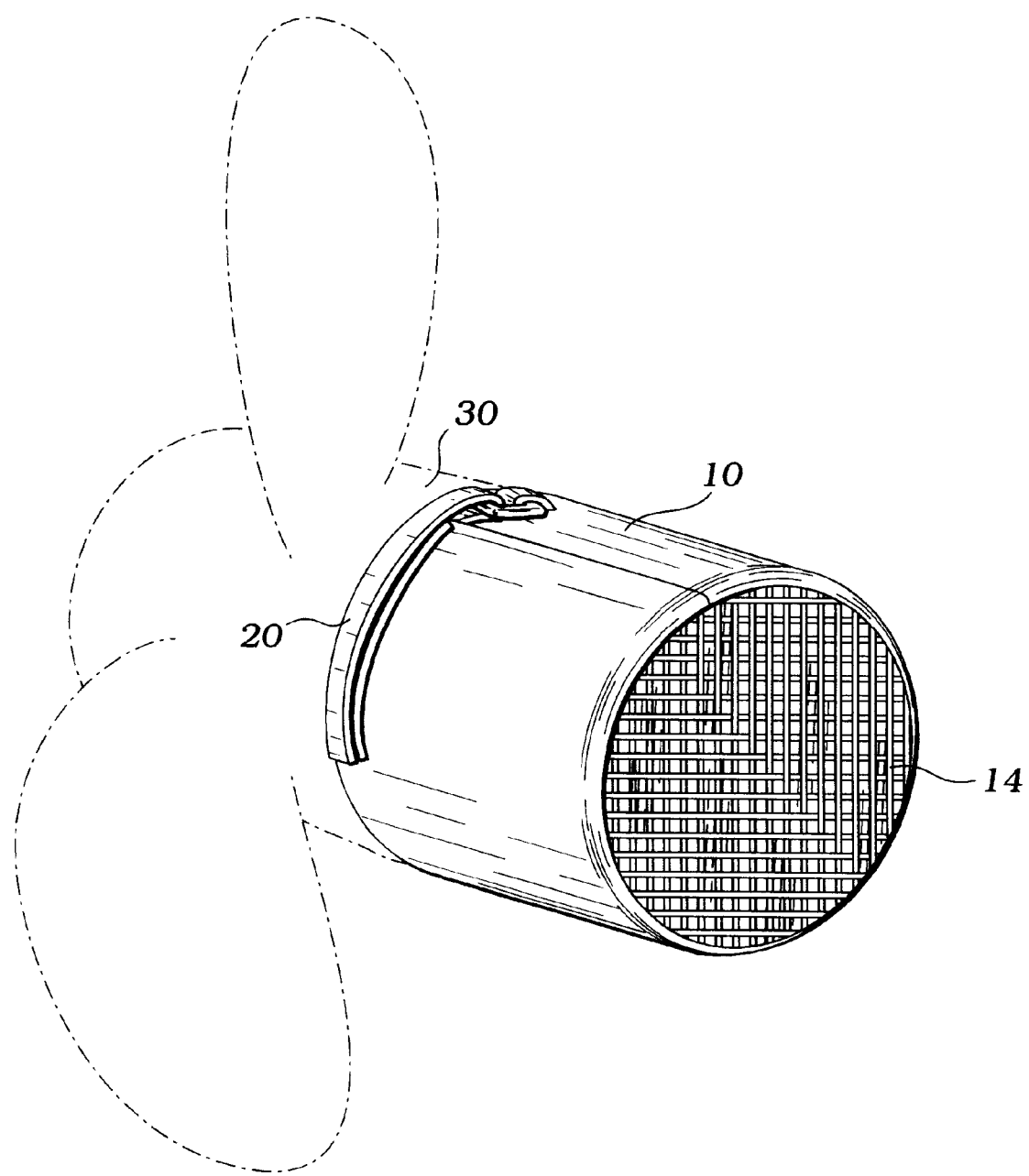
FIG. 3 is a perspective view thereof as assembled, tightened down and ready for use.

The above described drawing figures illustrate the invention, a muffler-filter apparatus comprising a filter housing 10 providing a flexible cylindrical wall 12 enclosed at one end by a filter media retaining means 14 such as a screen, integrally joined peripherally with a distal end rim 16 of the cylindrical wall 12, a means for tightening 20 of a proximal end rim 18 of the cylindrical wall 12 for enabling the proximal end rim 18 of the cylindrical wall 12 to be fixed onto a propeller hub 30 of an outboard motor so as to position the filter housing 10 for receiving exhausts of the outboard motor. A filter media means 40 provides a peripheral edge 42, adapted by its diameter for tight fitting within the cylindrical wall 12 so as to prevent exhaust gas blowby as exhaust gases pass through the filter media, i.e., between the peripheral edges 42 and the inside surface 15 of the cylindrical wall 12. The filter media means 40 is enabled, by virtue of its construction, much like many standard filter media, for capturing oil, dust and water delivered by exhaust gases passing therethrough while, at the same time, reducing exhaust noise from the engine of the outboard motor.

In one embodiment the filter media means 40 is at least one flexible disk shaped interwoven body 44 of an open cell construction for easily passing exhaust gases therethrough yet able to muffle noises.

In another embodiment the filter media means 40 is the above described at least one flexible disk shaped interwoven body 44 and is mounted adjacent to at least one rigid disk shaped body 46 having a plurality of open passages 48 therethrough so as to provide a rigidizing structure while enabling the relatively unrestricted passage of exhaust gases.

In this embodiment the filter media means 40 is preferably a plurality of the flexible disk shaped interwoven bodies 42 mounted in alternating arrangement with a plurality of the rigid disk shaped bodies 44 and aligned so as to provide a rigidizing structure while enabling the relatively unrestricted passage of exhaust gases.

Alternative structures and arrangements of the interwoven construction bodies 44 and the rigid bodies 46 can be arranged to accomplish a wide range of necessary filtering and muffling functions within the scope of this invention. It should be noted that the rigid bodies 46 are inventively marked at the peripheral edge 42 with an indicia 45 such that all of the rigid bodies 46 may be rotationally aligned or misaligned, with respect to holes 48, as desired, to change the conductance of the filter media means 40 to exhaust gases and noise. A conductance roughly equivalent to that presented by a water environment enables the invention to support engine tune-up activities. For a given pair or more of the rigid bodies, the conductance desired may be set by aligning or misaligning the holes 48 in the respective rigid bodies. To achieve a desired conductance the size and number of the holes 48 may be adjusted in accordance with routine experimental evaluation to find appropriate settings.

In use, the flexible cylindrical wall 12 of the present invention is placed over the end of the propeller hub 30 of an outboard engine. It is tightened in place by drawing the tightening strap 20 tightly around the proximal end rim 18 of the flexible cylindrical wall 12. With the filter housing 10 in place the outboard motor engine may be turned on and exhaust gases will move through the filter media 40 and then the filter media retaining means 14 so as to pass out of the engine without unnecessarily constricting the exhaust gases. Sound is diminished by the filter media 40 and oil droplets, dust and water are captured within the filter media so as to avoid contamination of the environment. The filter media 40, when it is soiled, may be replaced or cleaned and reused.

In order to enable the proximal end rim 18 of the flexible cylindrical wall 12 to be drawn tightly around the propeller hub 30, the cylindrical wall 12 provides a slit 11 enabling the wall 12 on one side of the slit 11 to be moved over the opposing side of the wall 12, thereby providing a tightening of the proximal end rim 18. The means for tightening 20 may be a Velcro® strap as shown in FIG. 1.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A muffler apparatus comprising:
    a filter housing providing a cylindrical wall having an inside surface terminating at one end by a filter media retaining means, the retaining means integrally joined peripherally with a distal end rim of the cylindrical wall;
    a means for tightening a proximal end rim of the cylindrical wall for enabling the proximal end rim of the cylindrical wall to be fixed onto a propeller hub of an outboard motor so as to position the filter housing for receiving exhausts of the outboard motor; and
    a filter media means providing a peripheral edge enabled by size and shape for tight fitting within the inside surface of the cylindrical wall so as to prevent exhaust gas blowby, the filter media means comprising at least one flexible disk shaped interwoven body of an open cell construction for easily passing exhaust gases therethrough while capturing particulate, oil, dust and water from exhaust gases passing therethrough while reducing exhaust noise.

2. A muffler apparatus comprising:
    a filter housing providing a cylindrical wall having an inside surface terminating at one end by a filter media retaining means, the retaining means integrally joined peripherally with a distal end rim of the cylindrical wall;
    a means for tightening a proximal end rim of the cylindrical wall for enabling the proximal end rim of the cylindrical wall to be fixed onto a propeller hub of an outboard motor so as to position the filter housing for receiving exhausts of the outboard motor; and
    a filter media means providing a peripheral edge enabled by size and shape for tight fitting within the inside surface of the cylindrical wall so as to prevent exhaust gas blowby, the filter media means comprising at least one flexible disk shaped interwoven body of an open cell construction for easily passing exhaust gases therethrough and, mounted adjacent thereto, at least one rigid disk shaped body having a plurality of open passages therethrough so as to provide a rigidizing structure while enabling the unrestricted passage of exhaust gases;
    the apparatus thereby enabled for capturing oil, dust and water from exhaust gases passing therethrough while reducing exhaust noise directed therein.

3. A muffler apparatus comprising:
    a filter housing providing a cylindrical wall having an inside surface terminating at one end by a filter media retaining means, the retaining means integrally joined peripherally with a distal end rim of the cylindrical wall;
    a means for tightening a proximal end rim of the cylindrical wall for enabling the proximal end rim of the cylindrical wall to be fixed onto a propeller hub of an outboard motor so as to position the filter housing for receiving exhausts of the outboard motor; and
    a filter media means providing a peripheral edge enabled by size and shape for tight fitting within the inside surface of the cylindrical wall so as to prevent exhaust gas blowby, and having a plurality of flexible disk shaped interwoven bodies of an open cell construction for easily passing exhaust gases therethrough and, mounted in alternating arrangement therewith, a plurality of rigid disk shaped bodies, each having a plurality of open passages therethrough the open passages of the rigid disk shaped bodies being aligned so as to provide a rigidizing structure while enabling capture of oil, dust and water from exhaust gases passing therethrough while reducing exhaust noise directed therein.

* * * * *